235-382 SR
10/25/83 XR 4,412,216

United States Patent [19] [11] 4,412,216

Mole et al. [45] Oct. 25, 1983

[54] SYSTEM FOR IDENTIFYING, FOR EXAMPLE, A PERSON FOR OPERATING AN ELECTRICAL APPLIANCE, A MECHANICAL APPLIANCE OR ANY OTHER APPLIANCE

[76] Inventors: Alain M. L. Mole, Avenue Ambroise Croisat 38400, Saint Martin d'Hères; Jean-Louis P. J. Savoyet, La Mayrie 38770, La Motte d'Aveillans, both of France

[21] Appl. No.: 250,564

[22] Filed: Apr. 3, 1981

[30] Foreign Application Priority Data

Apr. 3, 1980 [FR] France ............................... 80 07570

[51] Int. Cl.³ ........................ H04Q 3/00; E05B 49/00

[52] U.S. Cl. .......................... 340/825.31; 340/825.34; 235/382; 70/278

[58] Field of Search .................. 364/900; 70/277, 278; 340/825.31, 825.34; 235/382, 487, 375

[56] References Cited

U.S. PATENT DOCUMENTS

| | | | |
|---|---|---|---|
| 3,859,634 | 1/1975 | Perron et al. . | |
| 3,906,460 | 9/1975 | Halpern . | |
| 4,105,156 | 8/1978 | Dethloff | 235/487 |
| 4,144,523 | 3/1979 | Kaplit | 340/825.31 |
| 4,250,533 | 2/1981 | Nelson | 340/825.31 |

FOREIGN PATENT DOCUMENTS

| | | | |
|---|---|---|---|
| 2353103 | 12/1977 | France | 340/825.31 |

*Primary Examiner*—Donald J. Yusko
*Attorney, Agent, or Firm*—Owen, Wickersham & Erickson

[57] ABSTRACT

System for identifying, for example, a person for operating an electrical appliance, a mechanical appliance or any other appliance.

When the key (2) has been coupled to the electronic lock this first of all transmits, via circuit (18), a single pulse enabling the coded data originally contained in the passive memory formed by the set of switches (10) in the key to be loaded into the shift register (9). The shift register (9) is subsequently read by means of a succession of pulses transmitted by the serial reading circuit (20). The number of pulses corresponds to the number of bits in the shift register (9) owing to the existence of a read stop circuit (23) containing a pulse counter (42).

In a variant some of the switches (10) can be replaced by fusible links, the state of which can be changed at will by a writing circuit contained in the electronic key.

23 Claims, 7 Drawing Figures

SYSTEM FOR IDENTIFYING, FOR EXAMPLE, A PERSON FOR OPERATING AN ELECTRICAL APPLIANCE, A MECHANICAL APPLIANCE OR ANY OTHER APPLIANCE

This invention involves a system for identifying, for example, a person with a view to operating an electrical, mechanical or other type of appliance. Systems for identifying or recognizing persons have many applications. They are used in particular for opening doors, time control, running appliances used by several people like copying machines or, again, in systems for dispensing bank notes by credit cards.

In certain identification systems of conventional type, a movable part is used which comprises an identification code and which comes in the shape of a badge or of a credit card which the person to be identified carries around with them (see, for example, U.S. Pat. No. 3,637,994). The identification code takes the material form either of perforations or of a magnetic band on the badge. The use of such badges has many drawbacks. Indeed they are relatively bulky and can be easily damaged. In the case of perforated badges the code is relatively easy to recognize. When the identification code medium is magnetic the magnetic band can be damaged by scoring or under the effect of magnets. Furthermore, the appliance used to read badges of this type is necessarily complex and must, in particular, include a mechanical drive system enabling the badge to be moved for its identification code to be read. The result is that the reading appliances have a high construction cost.

In other identification systems a movable part is used in the form of an electronic key similar to a conventional key but comprising means for memorizing an indentification code which can be detected and recognized by a reading system like a lock but consisting of a set of electronic circuits (see for example, U.S. Pat. No. 4,038,637).

In French Pat. No. 2 363 837 a system is used with a key with a programmable memory in which the identification code may be contained in a shift register housed in the electronic key. The data contained in the key can be read by the electronic lock by means of pulses supplied by a clock contained in the said lock. The data thus obtained are compared with a code stored in the key in such a manner as to determine the identicality of the two codes and control, for example, the opening of a latch or any other required operation.

In this document, however, there is a high risk of fraudulent duplication of the electronic key the shift register of which can be read, thus enabling the identification code to be determined relatively easily by a technician familiar with this type of device.

The object of the present invention is thus an identification system which does not have the shortcomings of the identification systems at present used and known and in which the movable part analagous to a key is inert so that simply reading the shift register contained in the key does not allow the identification code to be determined simply.

The system for identifying, for example, a person with a view to operating an electrical appliance, a mechanical appliance or any other appliance according to the invention comprises a movable part similar to an electronic key containing an electronic identification code recorded in at least one preprogrammed passive type memory area and comprising at least one parallel/-serial shift register. The system also comprises a fixed part similar to an electronic lock, capable of being coupled with the movable part and comprising electric power supply means, electronic means for reading, recognising and interpreting the contents of the shift register of the movable part and means of comparison with a preprogrammed code in the said fixed part. According to the invention, electronic means of the fixed part also comprise means for supplying a pulse capable of initiating the loading of the electronic identification code originally stored in the movable part to the shift register of the said movable part.

In other words, according to the invention the movable part shift register initially contains no data, the identification code being stored in a memory area in the movable part separate from the shift register. When the movable part is coupled to the fixed part it is the loading pulse which acts on the movable part in such a manner as to transfer the code contained in the memory area to the shift register. So ordinary reading, unless specific measures are taken, of the shift register gives no information on the identification code, which leads to very high security against any attempt at fraudulent duplication of the electronic key of the system of this invention.

The memory area of the movable part preferably contains a multiplicity of switches or cut-outs which may be produced, for example, in the form of fuses, or by connections which can be destroyed and the position of which determines the electronic identification code. Each flip-flop in the movable part shift register is combined with one of the switches the position of which controls its state via two NAND gates receiving the loading pulse on one of their inputs. The first of the above-mentioned NAND gates is connected via its other input to the switch with which it is combined. The second NAND gate receives the output from the first gate on its other input.

In this way, as soon as a loading pulse appears on one of the inputs of the two NAND gates, each flip-flop of the shift register places itself in a state corresponding to the state of the switch it is associated with. The result is that the identification code, originally represented by the position of the multiplicity of switches, is recorded in the various shift register flip-flops due to the action of the above-mentioned loading pulse.

The means for generating the loading pulse contained in the fixed part or electronic lock, comprise a loading circuit fitted with a master-slave type double bistable combined with a NAND gate and receiving the clock pulses.

The electronic means contained in the fixed part for reading the contents of the movable part shift register, comprise a reading circuit fitted with a double bistable of the master-slave type combined with a NAND gate receiving the above-mentioned clock pulses and connected to the output of the loading circuit. In this way the read circuit supplies successive pulses enabling the data contained in the movable part shift register to be read serially after this register has been loaded with the identification code by the operation of the loading pulse.

A read stop circuit enables the number of clock pulses to be limited to the exact number of bits of the identification code contained in the movable part shift register. This read stop circuit comprises a pulse counter receiving the read pulses delivered by the read circuit and a monostable capable of delivering a read stop pulse when the number of pulses counted corresponds to the number of bits in the shift register, i.e. when the contents of the movable part shift register have been read once.

In an advantageous embodiment the system may also contain, in the fixed part, a circuit enabling successive tests. This circuit comprises a succession of flip-flops the zero resetting of which depends on the positive result of the comparison made by the comparison means with the code preprogrammed in the fixed part. In this way a number of fruitless tests is enabled which is equal to the number of flip-flops in this succession of flip-flops before an alarm is triggered.

Suitable timing means may also be provided for resetting all the system's flip-flops to zero at the time the key is inserted and after uncoupling.

In a preferred embodiment of the invention the fixed part also comprises writing means for altering the state of a preset section of the memory area of the movable part. In this way it is possible, depending on the instructions supplied by a computer preferably produced in the form of a microprocessor contained in the fixed part, to modify the identification code contained in the movable part or part of this code in accordance with a predetermined criterion or periodicity.

In a first embodiment, the fixed part writing means comprise a parallel-to-serial shift register receiving control pulses synchronized with the read pulses from the movable part shift register. The modifiable portion of the movable part memory area preferably comprises a multiplicity of fusible links which can be destroyed sequentially or randomly, instead of the above-mentioned switches, the position of which is invariable.

The movable part can comprise a second serial-to-parallel shift register receiving the serial signal from the write means shift register. This signal leads to sequential or random rupture of certain fusible links chosen so that the current flowing through them then leads to their rupture.

In another version the fixed part of the system of the invention comprises means for supplying a link rupture command signal after writing has stopped. This signal is then sent to a set of AND gates receiving on their other input the output from each of the flip-flops of the second serial-to-parallel shift register of the movable part. The output from each AND gate is connected to one of the terminals of a fusible link.

In another embodiment the writing means are combined with a loading circuit and a reading circuit supplying control pulses, the number of which is determined by independent writing stop means, to a parallel-to-serial shift register.

It is thus possible to change as required, sequentially or randomly, a preset number of bits of the movable part identification code, thus making any fraudulent use of the system still more difficult.

The invention will be more clearly understood on studying several embodiments taken as non-restrictive examples and illustrated by the appended drawings, in which.

Figure 1:
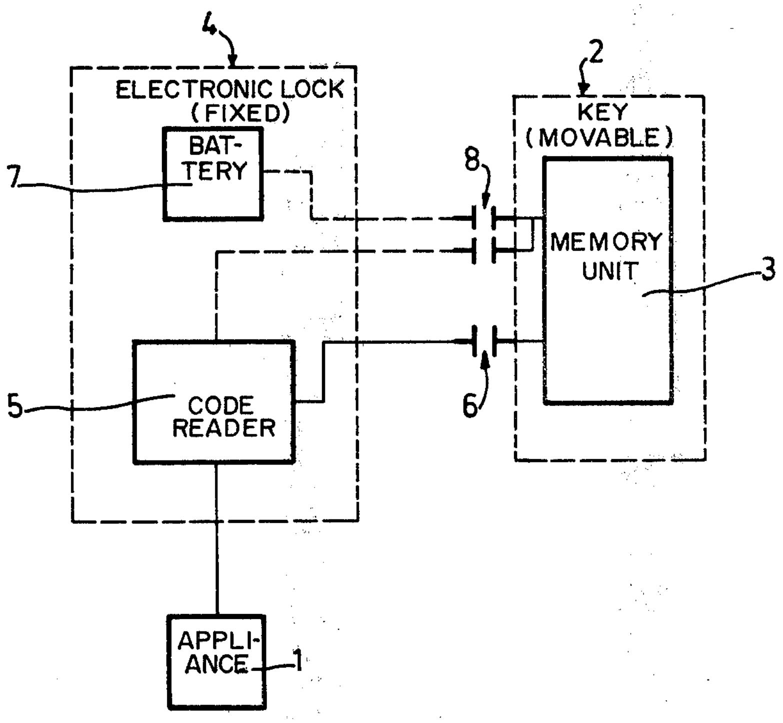
FIG. 1 represents the overall structure of the identification system according to this invention.

As can be seen in FIG. 1, the system for identifying, for example, a person with a view to operating an electrical appliance, a mechanical appliance or any other appliance marked with the general reference 1, comprises a movable part which can be carried by the said person and is marked 2. Preferably the same movable part comes in the form of a key. It can advantageously be formed of a small fibre glass plate sandwiched between two thicknesses of hard plastics material withstanding both solvents and extreme temperatures. In these conditions the electronic key is very strong and its wear negligeable, particularly compared with the wear of a badge of the conventional type.

The electronic key comprises six or seven electrical contacts depending on the system variants. These contacts can be made mechanically and be formed by conducting elements buried in the engaging plastics material on the fixed side acting as the electronic lock with steel balls held by springs.

It is also possible to contemplate making these contacts differently, for example by an opto-electronic connection.

The movable part or key 2 contains a memory unit 3 of preprogrammed passive type containing an electronic identification code corresponding to the person or to any other data able to permit the operation of, for example, opening a latch.

The identification system also comprises a fixed part designated by the general reference number 4, acting as an electronic lock and comprising electronic means 5 capable of recognizing the electronic code contained in the key and interpreting it in order to operate the appliance 1.

The memory unit 3 is coupled by movable means to the said electronic means 5 by connections 6 made by contacts as has just been stated.

The fixed part 4 acting as the lock also comprises power supply means in the form of a battery 7 which only feeds the memory unit 3 and the electronic means 5 when the key 2 is coupled with the lock 4.

it will be noted that the power supply voltage is preferably very low, around +5 volts, with the demand current remaining limited to several milliamperes in order to eliminate any danger to the user.

The power is supplied via a connection 8 designed in the fixed part 4 and the movable part 2, the power supply circuit being shown by a broken line in FIG. 1.

Figure 2:
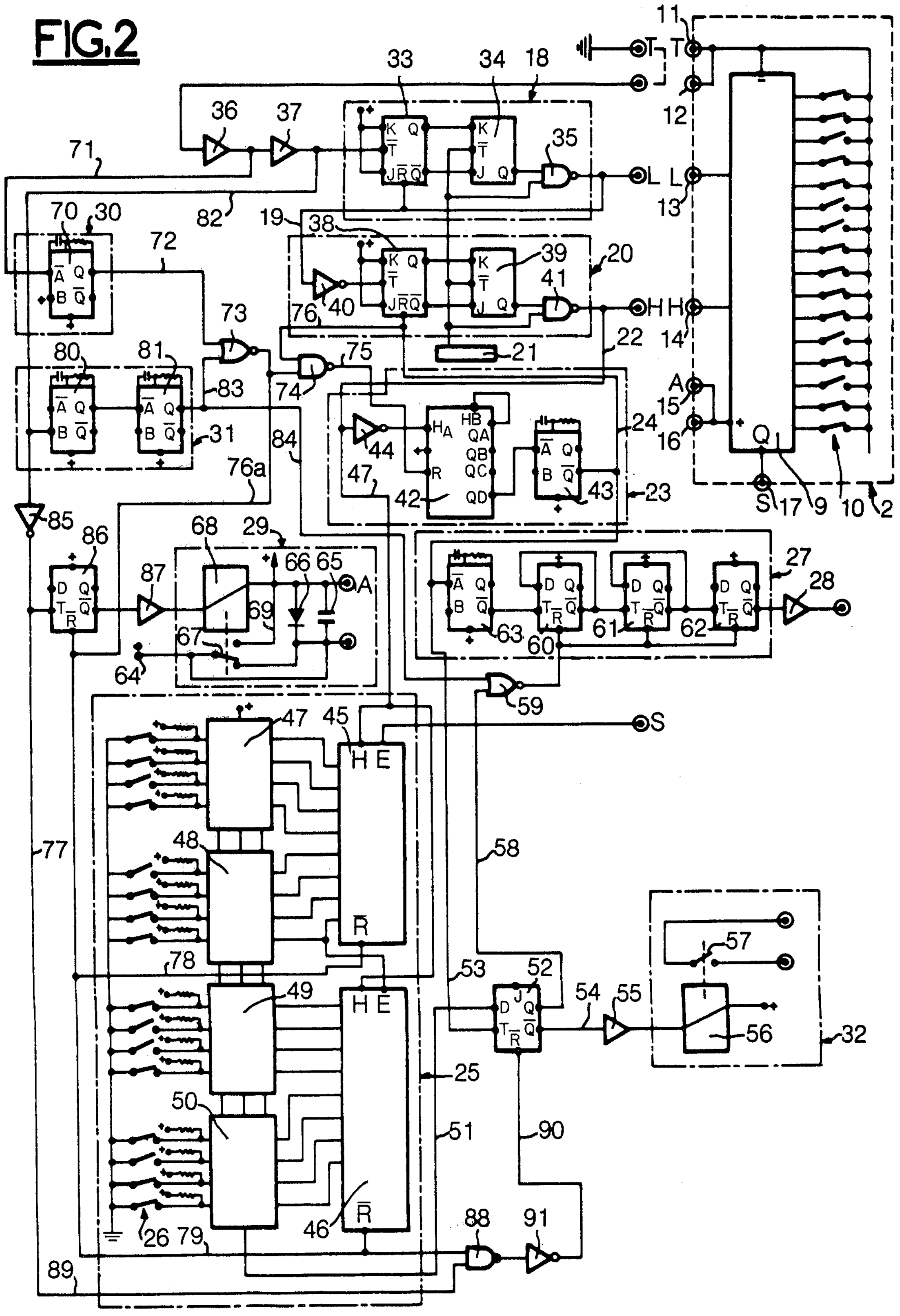
FIG. 2 shows in more detail an example of a specific identification system designed for controlling a door latch.

We shall now describe an example of an embodiment of an identification system illustrated in FIG. 2, which system is designed to operate a door latch.

In the schematic diagram in FIG. 2 we find the electronic key 2 shown schematically and comprising a parallel/serial shift register 9 controlled by a succession of sixteen switches 10 whose open or closed position defines one of the bits of the identification code. The switches 10 can, for example, consist of connections part of which have been destroyed initially in such a way as to cut out the electrical connection between the two terminals.

The key 2 comprises seven terminals designed to come into contact with the corresponding terminals of the electronic lock when the key is coupled to this lock.

The terminals T marked 11 and 12 connected together in the key 2 are designed to be connected to the system earth (ground).

The terminal L marked 13 is designed to receive a pulse for loading the code contained in the set of switches 10 into the register 9. The terminal H marked 14 is intended to receive a succession of pulses enabling the data contained in the shift register 9 to be read. The terminals A marked 15 and 16 connected together in the key 2 are intended to be connected to the electric power supply situated in the lock. Finally, the output terminal S marked 17 is connected to the output Q of the shift register 9.

It will immediately be noted that the electronic key 2 is passive and contains no power supply source. Unless it is coupled to the lock the shift register 9 contains no data and therefore reading it cannot supply the identification code.

The fixed part or electronic lock also comprises seven terminals marked with the same letters T, L, H, A and S arranged in such a way as to be capable of coming into contact with the corresponding terminals of the key when this is coupled with the lock.

The electronic lock comprises a loading circuit marked 18 overall, the input of which is connected to the terminal 12 when the key is coupled with the lock, i.e. with the system earth, and the output of which supplies a loading pulse to terminal L.

The output of the loading circuit 18 is also connected by connections 19 to the input of a read circuit marked 20 overall and supplying to terminal H a succession of pulses delivered by a clock circuit 21.

The output of the read circuit 20 is also connected via connection 22 to the input of a read circuit marked 23 overall the output of which returns via connection 24 to the read circuit 20 so as to deliver a read stop pulse stopping the transmission of clock pulses to terminal H when the contents of the shift register 9 have been read once, i.e. when a total number of sixteen pulses has appeared on terminal H, this number being equal to the number of bits of the register 9.

Terminal S connected to the output Q of the shift register 9 receives the serial signal representing the data contained in the shift register 9. The terminal S is connected to the input of a circuit 25 carrying out a serial-to-parallel conversion and a comparison of the read data coming from the key 2 with the identification code preprogrammed into the electronic lock itself and formed, in the illustrated example, by a set of switches 26 having the same state as the switches 10 in the key.

The electronic lock also comprises, in the example illustrated, a circuit for enabling successive tests 27 connected by an output connection 28 to an alarm device which is triggered after four fruitless tests in succession. A circuit 29 connected to the terminals A of the kye 2 allows the power supply to be stabilized at +5 volts.

A first reset circuit 30 resets all the flip-flops in the electronic key system at the time the key is coupled with the lock.

A second reset circuit 31 resets all the flip-flops and cuts off the power supply when the key is uncoupled.

Finally a latch operation circuit 32 receives a signal when the comparison performed in circuit 25 is positive.

We shall now describe in greater detail the various circuits which have just been reviewed.

The loading circuit 18 consists of a double master-slave bistable formed by a first flip-flop 33 or "master" and a second flip-flop 34 or "slave". The two flip-flops 33, 34 are connected together in the conventional manner, with the second flip-flop 34 receiving the clock signal from the clock circuit 21 on its $\overline{T}$ terminal. The Q output from flip-flop 34 is connected to one of the inputs of the NAND gate 35 also receiving the clock signal on its second input. The output of gate 35 connected to terminal L of the lock is also connected to the "drive" input $\overline{R}$ of the first flip-flop 33 so as to reset it as soon as an output signal is transmitted. Under these conditions it can be seen that the loading circuit 18 supplies a single pulse, called the loading pulse, to the terminal L.

The $\overline{T}$ input of the first flip-flop 33 is connected via the two time delay circuits 36 and 37 to the system earth via the terminal $\overline{T}$ when the key 2 is coupled with the lock. Under these conditions the system then operates in negative logic.

The read circuit 20 is of the same type as the loading circuit 18 and it comprises, like the latter, a double master-slave bistable 38, 39 mounted in the same way. The $\overline{T}$ of the first flip-flop 38 receives, via the inverter 40, the output pulse from the NAND gate 35 of the loading circuit 18. The NAND gate 41 connected to the output of the second flip-flop in the same way as the NAND gate 35 of the loading circuit 18, thus supplies a succession of pulses on terminal H, these pulses being called clock pulses in the rest of this description.

The output of the NAND gate 41 is connected via connection 22 to the read stop circuit 23 which comprises a sixteens counter 42, the output $Q_D$ of which is connected to the $\overline{A}$ input of a monostable 43.

The output pulses from the NAND gate 41, or clock pulses which appear on the terminal H transmitted by connection 22 via inverter 44 to the input HA of the counter 42 are counted until the number sixteen is reached, which corresponds in the illustrated example to the number of bits in the shift register 9 of the key 2, i.e. to the number of switches 10. When this number has been reached the output $\overline{Q}$ from the monostable 43 delivers an output signal applied via connection 24 to the "drive" input $\overline{R}$ of the first flip-flop 38 of the read circuit 20, resetting this latter and thus stopping the clock pulses transmitted by circuit 20.

By this means reading is therefore achieved of all the bits of the shift register 9.

The signal appearing on terminal S and representing the identification code initially memorized by the multiplicity of switches 10 of the key 2, after it has been read serially in the shift register 9, feeds the input E of a serial-to-parallel converter comprising two serial-to-parallel shift registers 45 and 46 contained in the conversion and comparison circuit 25. In order to synchronize the serial-to-parallel conversion performed in the two registers 45 and 46 with the reading of the shift register 9 the clock pulses are also applied through connection 47 to the inputs H of the two registers 45 and 46. The comparison code preprogrammed in the fixed part or lock, materialized in the position of the sixteen switches 26, is compared with the result of the serial-to-parallel conversion in the comparison circuit consisting of the four comparators 47, 48, 49 and 50 connected in series and connected on the one hand to the various parallel outputs of the two conversion registers 45 and 46 and on the other hand to the various switches 26 grouped in fours for each of the comparators 47 to 50.

The result of comparison leaving the last element 50 is a "zero" or a "one" signal depending on whether the comparison is negative or positive. The result of this comparison appearing on connection 51 is applied to the input D of the flip-flop 52 which also receives on its input T via connection 53 the output signal from the read stop circuit 23. When the comparison is positive a signal is transmitted by the output $\overline{Q}$ of flip-flop 52 and sent by connection 54 via the amplifier 55 to the relay 56 closing the switch 57 of the latch operation circuit 32.

At the same time the output Q from the flip-flop 52 is connected via connection 58 to the NOR gate 59, the output of which is connected to the resetting drive inputs $\overline{R}$ of the three flip-flops 60, 61 and 62, of the circuit enabling successive tests 27, mounted in cascade and connected to the alarm control 28. The input T of the first flip-flop 60 is connected to the output $\overline{Q}$ of the time delay monostable receiving on its $\overline{A}$ input the output signal from the read stop circuit 23.

If the comparison is negative, a zero signal appears on the input to the monostable 52 so that the relay 56 is not energized and the latch is not opened. However a loading command acts via the monostable 63 on the T input of the first flip-flop 60 which moves forward one.

Owing to the cascade assembly of flip-flops 60, 61 and 62 it can be seen that four unsuccessful tests are enabled before the alarm 28 is triggered by the successive tests enabling circuit 27. The power supply stabilization circuit 29 comprises an input terminal 64 connected to the power supply battery, for example +5 volts contained in the electronic lock but not shown in the figure. The two terminals A intended to engage with terminals 15 and 16 of the key 2 are connected via the capacitor 65 and the diode 66.

When the key 2 is coupled to the electronic lock the current flows between the two A terminals. The switch 67 closes due to the action of the relay 68 so that the current virtually no longer flows via the key 2 but via connection 69 placed on shunt. Under these conditions the power supply to the whole of the electronic lock circuit is not disturbed, notably by possible key vibrations.

The electronic key also contains in the first resetting circuit 30 a monostable 70 receiving the output signal from the delay circuit 36 on its $\overline{A}$ terminal via connection 71. In these conditions the monostable 70 reacts on a signal having a falling edge on connection 71, i.e. on coupling with key 2. The output Q of the flip-flop 70 is connected via line 72 to one of the inputs of the NOR gate 73. The output signal from the NOR gate 73 allows counter 42 to be reset via the NAND gate 74 and its output connection 75, with the said gate 74 receiving the output signal from the read stop circuit 23 via connection 76. In the same way the output signal from the NOR gate 73 enables the two registers 45 and 46 of the serial/parallel conversion circuit 25 to be reset via connections 76*a*, 77, 78 and 79 by the drive inputs $\overline{R}$.

The circuit 31 for zero resetting at the termination of reading when the key is withdrawn comprises two monostables 80 and 81 connected in cascade with the output Q from the monostable 80 being connected to the $\overline{A}$ input of monostable 81. The first monostable 80 receives the delay circuit 37 output signal on its B input via connection 82 and reacts in accordance with this circuit on a signal with a rising edge on connection 82, i.e. on uncoupling of the key. The Q output of the second monostable 81, which supplies a very short pulse, is connected by connection 83 to the second input of the NOR gate 73 which leads, as was previously seen, to resetting of the counter 42 and of the serial/parallel conversion circuit 25. The Q output of the monostable 81 is also connected via connection 84 to one of the inputs of the NOR gate 59 in such a manner as to reset the flip-flops 60, 61 and 62 of the successive tests enabling circuit 27 when the key is uncoupled.

At the time the key is uncoupled, the rising edge signal on connection 82 at the time delay circuit 37 output applied via the inverter 85 to the T input of flip-flop 86 causes, through the amplifier 87 connected to its $\overline{Q}$ output, the relay 68 of the power supply circuit 29 to be triggered so that the power supply is cut off. The flip-flop 86 is reset by its $\overline{R}$ input via connection 76*a* connected to the NOR gate 73 output when the key is uncoupled from the lock.

It will also be noted that the NAND gate 88 receives on its two inputs respectively the output signal from the NOR gate 73 via connection 79 and the output signal from the inverter 85 via connection 89. The output signal from the NAND gate 88 enables resetting of the flip-flop 52 by its $\overline{R}$ input by means of connection 90 and inverter 91 at the time of uncoupling the key, after expiry of the delay time of the delay circuit 37.

Figure 3:
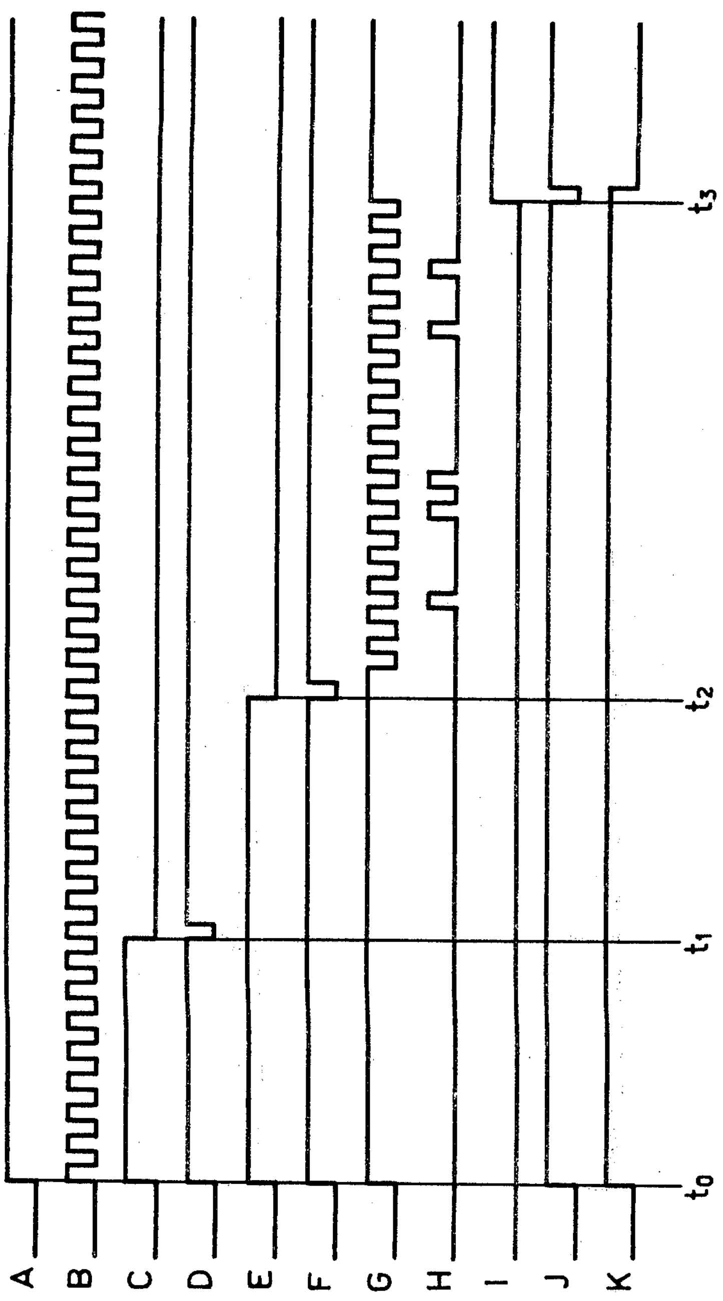
FIG. 3 illustrates the shape of the signals as they vary over time at various points in the schematic of FIG. 2.

FIG. 3 shows, plotted against time, the signals appearing at various points in the schematic in FIG. 2. These various schemes are labelled A to K in alphabetical order.

When the key 2 is inserted into the electronic lock the whole of the system is energized at time $t_o$ as shown in graph A. The clock circuit 21 transmits successive pulses as shown in graph B. The time delay circuit 36 delivers at time $t_1$ a falling edge signal (graph C) which leads through monostable 70 to a reset pulse shown in graph D on the output of the NOR gate 73.

The output of the second time delay circuit 37 delivers a trailing edge signal (graph E) at time $t_2$ which causes the loading circuit 18 to transmit a negative loading pulse visible on graph F.

This loading pulse leads to transmission of a succession of sixteen negative clock pulses on terminal H at the output of the read circuit 20 as shown in graph G. The series signal appearing on the output terminal S of the shift register 9 is shown in graph H. It includes a number of positive pulses corresponding to the open switches 10.

The output from the comparator 50 is shown in graph I with a leading edge at time $t_3$ if the comparison is positive. The negative pulse supplied by the flip-flop 52 can be seen in graph J and the supply to the latch is shown in graph K in the form of a trailing edge signal.

Figure 4:
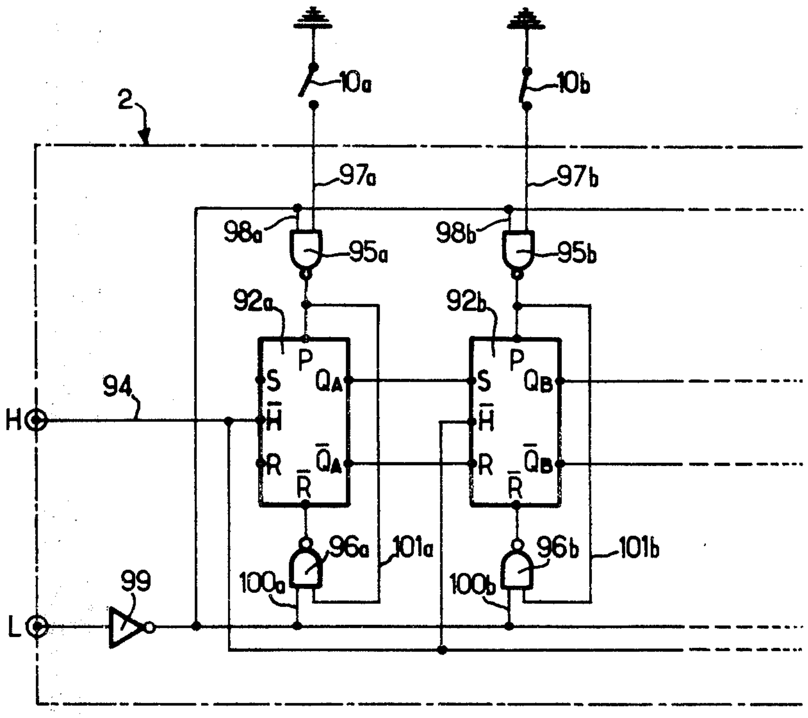
FIG. 4 is a part detail view of the movable part shift register showing the identification code loading command circuit.

The detailed structure of the key shift register 9 and of the set of switches 10 acting as the preprogrammed memory is partly illustrated in FIG. 4. As can be seen in this figure, switch 10*a* is open which, in the negative logic circuit chosen as an example for the circuit in FIG. 2, corresponds to a "one" signal. Switch 10*b*, connected to earth, is closed, which corresponds to a "zero" signal. The other switches have not been shown in FIG. 4. In this figure we also find the first two flip-flops 92*a* and 92*b* corresponding to the first two bits of the shift register 9 which receive on their $\overline{H}$ inputs the clock signals coming from the lock read circuit 20 via connection 94 connected to the H terminal. The various flip-flops 92a, 92b, etc. are connected together in conventional cascade, with the Q and $\overline{Q}$ outputs of each upstream flip-flop being connected to the S and R inputs of the immediately following flip-flop so as to make the shift register 9.

Two NAND gates 95a and 96a are combined with flip-flop 92a, the outputs from the two NAND gates being connected respectively to the P input placing flip-flop 92a in the "one" state and to the $\overline{R}$ input placing flip-flop 92a in the "zero" state.

The first NAND gate 95a is connected by its first input via connection 97a to switch 10a and by its second input via connection 98a to the output of the inverter 99 receiving the loading pulse on the L terminal.

The output of the inverter 99 is also connected by connection 100a to one of the inputs of the NAND gate 96a which receives on its other input, by connection 101a, the output from NAND gate 95a.

The same elements marked "b" are combined with flip-flop 92b and switch 10b. The same elements occur for each following bistable corresponding to each bit in the shift register 9.

In the case of switch 10a, a "one" signal is applied to input 97a of the NAND gate 95a. Owing to the presence of the inverter 99, the negative loading pulse causes a "one" signal to be present on the second input 98a which leads to a "zero" signal at the output of NAND gate 95a. This "zero" signal, applied to input 101a of the second NAND gate 96a, which receives a "one" signal on its other input, leads to a "one" signal on the $\overline{R}$ resetting input of flip-flop 92a. Inspection of the circuit associated with flip-flop 92b shows that the closed position of switch 10b leads, for flip-flop 92b, to an opposite state to the state of flip-flop 92a. In these conditions, when a single loading pulse appears on the L terminal this leads to transfer of the identification code, materially represented by the position of the various switches 10, in the form of the state of the various flip-flops 92 which can then be read serially by the clock signals applied to the $\overline{H}$ inputs. If there is no loading pulse all the flip-flops remain in the zero state in the illustrated example.

It should be noted that the loading pulse could, in a variant, be suitably sized by a circuit designed into the electronic lock; the pulse is then only taken into consideration if it corresponds to the sizing laid down.

Although the identification system of the invention has been illustrated with reference to the circuit in FIG. 2 for opening an electric latch, it will be understood that it would be easy to adapt the system of the invention in order to control room access or manage personnel. Thus, in this case, it is possible to allot a pre-determined address to a number of key identification code bits. It is possible, for example, to assign, in the first register 45 of the serial/parallel conversion circuit 25, a storage area corresponding to a pre-set fixed address. After being read this fixed address is compared to a pre-programmed code in the same way as the comparison made by the comparison elements 47 and 48 in FIG. 2. If the comparison is positive access to the room is enabled by means of a door or a barrier which can open; the person's name and also the time of entry and departure can be automatically retained by the electronic lock. The user's name or a code corresponding to an identification datum retained after the key has been used is written into another storage area containing an identification code which is read by the second serial/parallel shift register.

Figure 5:
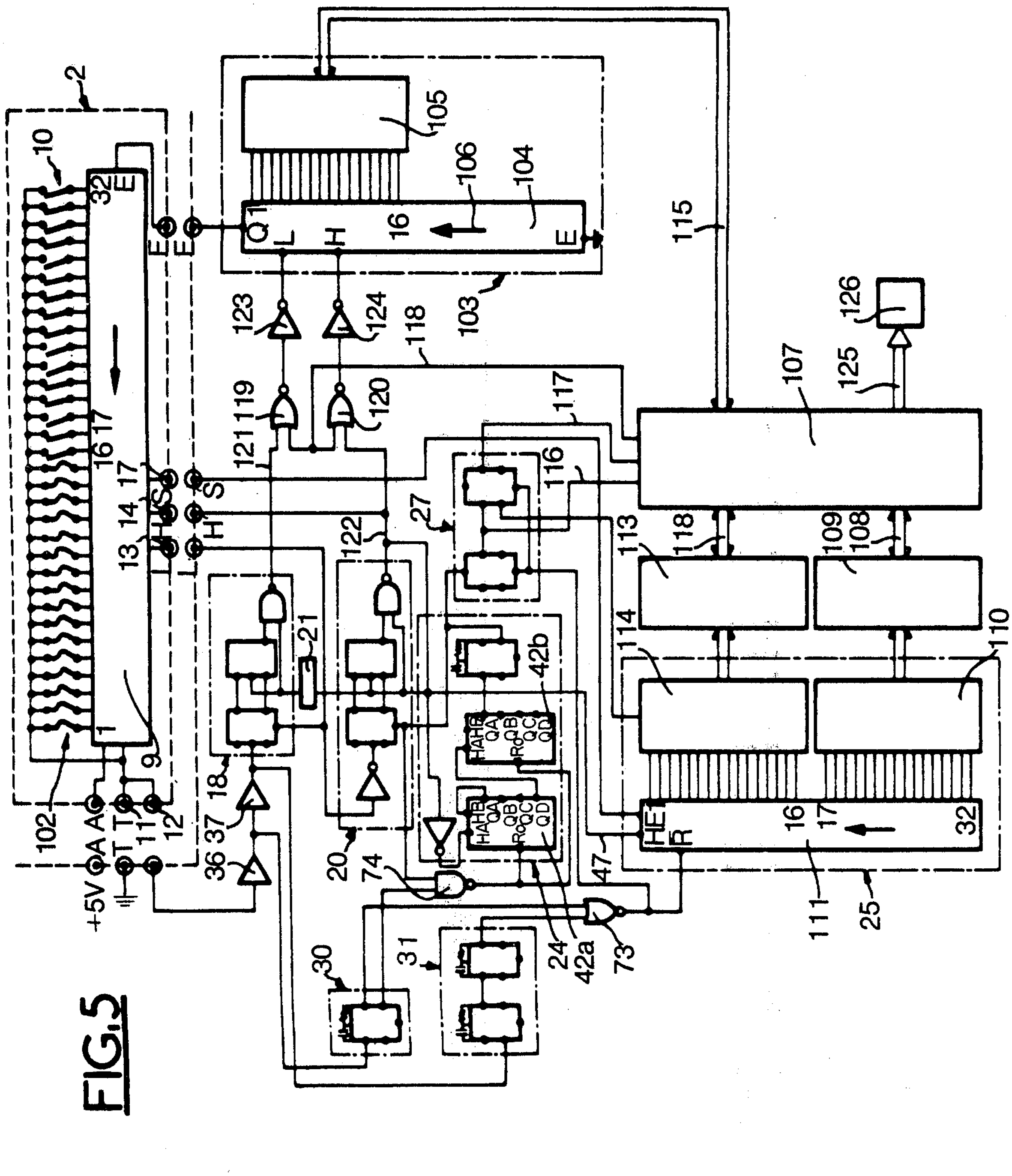
FIG. 5 is a similar schematic to the one in FIG. 2 showing a variant making it possible to program identification code changes and comprising a write control synchronized with reading.

In certain applications it may be necessary to modify the identification code contained in the key and also the corresponding pre-programmed code contained in the lock, at will. FIG. 5 illustrates an identification system of this type enabling the internal identification system of the key to be altered sequentially at chosen time periods or after a pre-set number of key utilizations. The circuit illustrated to give an example in FIG. 5 repeats a number of circuit elements already described with reference to FIG. 2 and which have therefore been marked in the same way. As can be seen in FIG. 5 the shift register 9 comprises 32 bits corresponding respectively to sixteen switches 10 similar to the pre-programmed position switches in the FIG. 2 schematic and sixteen fusible links 102 which can be destroyed in order to change the identification code originally contained in the key 2. The various fusible links 102 forming switches which can be changed at will sequentially or randomly may be eliminated by fusion due to the action of a signal supplied at the E terminal setting up a contact between the key 2 and the electronic lock. The signal supplied on the E terminal comes from a write circuit 103 containing a parallel/serial shift register 104 and a circuit interface 105. It will be noted that the direction shift in register 104 is indicated by the arrow 106 and that the interface 103 only supplies a coded signal for bits 16 to 1 of register 104 corresponding to the position of the fusible links 102 of register 9.

In the example illustrated in FIG. 5, the whole of the system is controlled by a microprocessor 107 which is capable of sending, by the data bus 108 to an interface circuit 109, a code stored in the protected memory 110 which forms part of the serial/parallel conversion and comparison circuit 25 and which processes bits 32 to 17 of serial/parallel register 111 corresponding to the bits of the switches 10.

Similarly, the microprocessor is capable, via data bus 112 connected to the interface circuit 113, of sending data on the key to the comparator 114 which is connected, insofar as bits 1 to 16 are concerned, to the shift register 111.

The microprocessor is also capable, via data bus 115, of carrying out a sequential or random alteration of the state of the various fusible links 102 acting via interface 105 on the shift register 104 of the writing means 103 as was previously explained.

The various outputs of the successive tests enabling and alarm control circuit 27 are connected by connections 116 and 117 to the microprocessor 107 with a view to triggering the alarm according to the procedures laid down by the microprocessor programming.

The microprocessor 107 is also capable of supplying a write enable signal on connection 118 connected to the input of two NOR gates 119 and 120. The first NOR gate 119 receives, on its other input, the loading pulse from the loading circuit 18 via connection 121. The second NOR gate 120 receives, on its second input, the read pulses delivered by the serial read circuit 20 via connection 122. The outputs from the two gates 119 and 120 are connected via two inverters 123 and 124 respectively to the L terminal and the H terminal of the shift register 104; these terminals have the same function as the terminals marked with the same letters of register 9.

The system operates in the following way; when the key 2 is coupled with the electronic lock a read operation is first of all carried out which is similar to the one that can be performed with the system illustrated in FIG. 2. During this operation the microprocessor 107 gives out no write enable signal on connection 118 so that NOR gates 119 and 120 are blocked and the write circuit 103 does not operate. The read operations first of all allow the key to be identified by means of the fixed identification code contained originally in the switches 10. Thus, after the fixed code contained in the switches 10 and the variable code represented by the fusible links 102 have been loaded into the shift register 9 by means of a loading pulse delivered by circiuit 18, the 32 bits in the shift register 9 are read serially by means of the 32 pulses transmitted by the read circuit 20. In order to perform this, bits 32 to 17 of the shift register 9 transferred by shift register 111 are compared with the fixed contents of the protected memory 110. Subsequently bits 16 to 1 corresponding to the modifiable section represented materially by the fusible links 102 are compared with the state of the code contained in the comparator 114. If all these comparisons give a positive result, the microprocessor 107 supplies, by bus 125, a control or command signal to the circuit or device being controlled 126.

When the read operation and the commands have thus been performed, it is possible to alter a section of the memory area of the key 2 by breaking a number of fusible links 2. This operation may be carried out periodically in accordance with instructions which can be programmed into the microprocessor 107. In this case, with the key coupled to the electronic lock, the microprocessor supplies a write enable signal on connection 118 so as to change the output state of the two NOR gates 119 and 120. In these conditions the loading pulse supplied by the loading circuit 18 is applied to the L input of shift register 104 which enables a coded datum contained in the microprocessor 107 or in a supplementary memory to pass via the interface circuit 105 into the various flip-flops corresponding to bits 16 to 1 of shift register 104. At the same time the microprocessor 107, via data bus 112 and interface circuit 113, commands the changing of the code which has to be compared by the comparator 114. The successive read pulses transmitted by the read circuit 20 are sent by the NOR gate 120 to the H terminal of shift register 104 so as to enable the latter to be read and a serial signal to be transmitted from the E terminal of the key 2 shift register 9.

The fusible links 102 are selected so that the weak current applied to their terminals in accordance with the signal thus supplied is large enough to burn them out according to the "zero" or "one" level of this signal.

It will be noted that, since the number of read pulses transmitted by circuit 20 is exactly 32, the read stop circuit 24 comprises two sixteens counters, 42*a* and 42*b*.

In the simplest embodiment of the system illustrated in FIG. 5, the various fusible links 102 are burnt out in succession from right to left in FIG. 5. In a more advanced variant it is possible, depending on the way the microprocessor 107 is programmed, at each write operation, to randomly fuse a number of fusible links in accordance with a code set by the microprocessor 107 and sent via the interface circuit 105.

It will be noted that a key that has not already undergone such a change will be recognized owing to the fact that the fixed code corresponding to the switches 10 will be recognized appropriately, since the modifiable section of the memory area is different from the one contained in the comparator 114. On the other hand, a counterfeit key will be easily recognized because no memory area will correspond to the data encoded both in the comparator 110 and in the protected memory area 114.

In a variant it is also possible to use the means illustrated in FIG. 5 to cause all the fusible links 102 to be fused in a single writing operation when the system detects a forged key. This results in "destruction" of the key.

It will be understood that the write command can be programmed according to criteria determined by the microprocessor 107, for example according to a preset sequence or each time a key is used or, again, according to any other pre-determined criterion.

Figure 6:
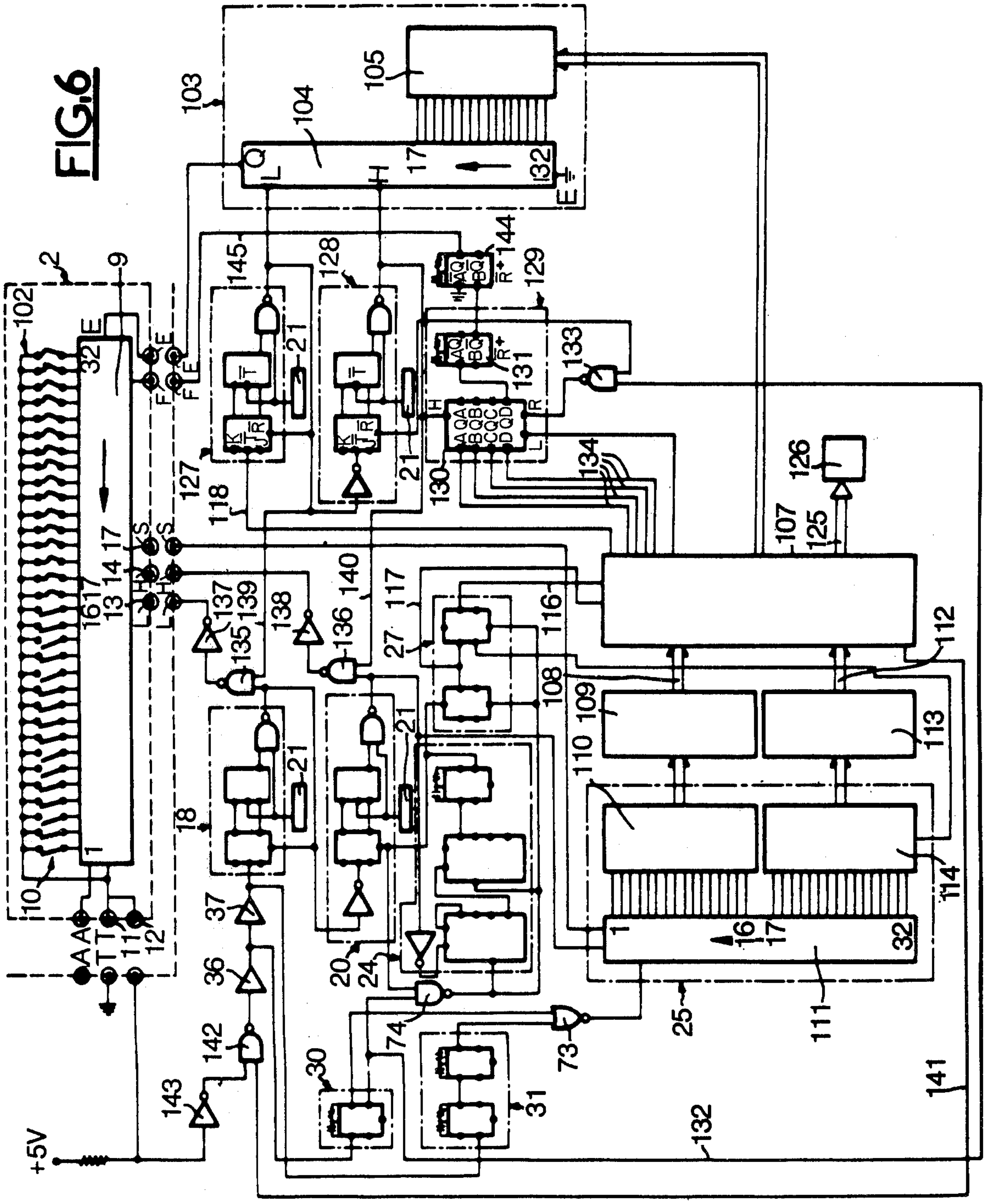
FIG. 6 illustrates a variant of the system in FIG. 5 in which the write control is independent of reading.

The emdodiment illustrated in FIG. 6 differs from the embodiment in FIG. 5 mainly in three respects. First of all the fusible links 102 correspond to bits 17 to 32 of the key shift register 9, whilst the switches 10 correspond to bits 1 to 16. The position of the fixed and changeable areas in the key 2 memory is therefore reversed with respect to FIG. 5. This means that the interface circuit 105 of the write circuit 103 works with bits 17 to 32 of the shift register 104 and the positions of the comparator 110 and the protected memory 114 are reversed with respect to shift register 111 of the serial/parallel conversion and comparison circuit 25.

Furthermore, the write circuit 103 is here controlled by independent means comprising a loading circuit 127 which is the same in all respects as the loading circuit 18, a serial read circuit 128 the same in all respects as the read circuit 20 and a write stop circuit 129 the same in all respects as the write stop circuit 24 and comprising a sixteens counter 130 the $Q_D$ output of which is connected to the $\overline{A}$ input of the monostable 131 delivering the zero resetting signal for the master-slave bistable of the reading circuit 123 on the monostable's $\overline{Q}$ output.

The counter 130 is reset to zero by the output signal of the resetting circuit 30 via connection 132 and the NAND gate 133.

The data coded inside the counter 130 is supplied by its A, B, C, D inputs via connections 134 from the microprocessor. It can thus be seen that it is possible to stop the pulses transmitted by the read circuit 128 before the sixteenth bit has been reached. It thus becomes possible to bring about successive fusing from right to left of the number of fusible links 102 corresponding to the coded data introduced into the counter 130 by the microprocessor.

The normal operation of reading the key 2 is performed as in the embodiment in FIG. 5 by means of circuits 18 and 20 the outputs of which are connected to the NAND gates 135 and 136 connected at their output via inverters 137 and 138 to the respective L and H terminals of the key 2. The second inputs of gates 135 and 136 are connected respectively to the outputs of circuits 127 and 128 via connection 139 and 140.

It will be noted that writing is also commanded by a signal from the microprocessor via connection 141 connected to one of the inputs of a NAND gate 142 connected by its other input to terminal 12 of the key via the inverter 143 and feeding a first time delay circuit 36 from its output.

In the embodiment illustrated in FIG. 6 means have also been provided for supplying a signal commanding the fusing of the various fusible links 102, comprising a monostable 144 the Best input of which is connected to the $\overline{Q}$ output of monostable 131 of the write stop circuit 129. The Q output of monostable 144 delivers via connection 145 a fusible link repture signal to the key F terminal. In these conditions, after the write stop, i.e. after the last pulse supplied by circuit 128 when the serial output signal from register 104 passes through register 9, monostable 144 delivers a pulse enabling the required fusible links 102 to be burnt out with certainty.

Figure 7:
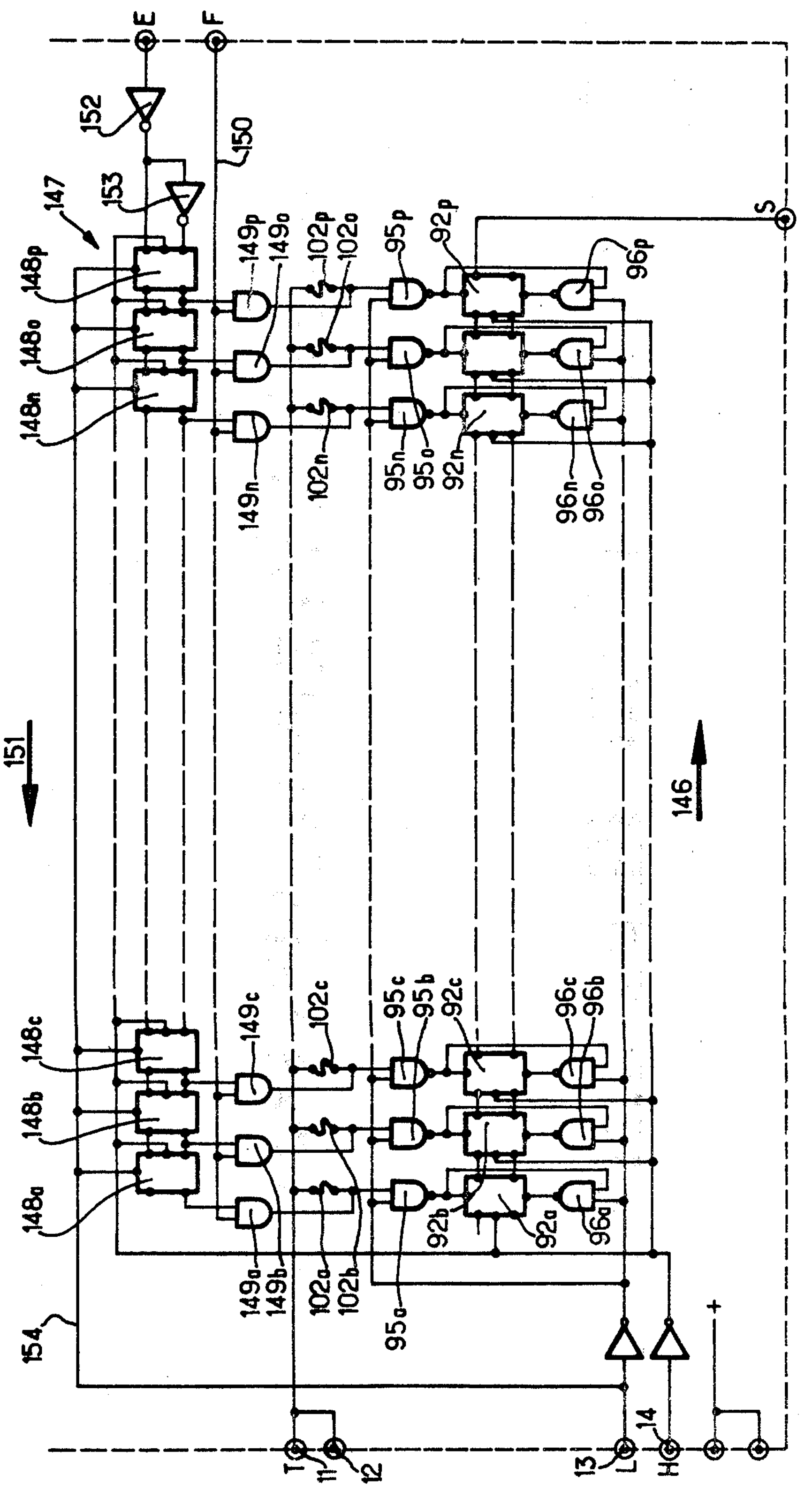
FIG. 7 illustrates in greater detail the movable part electronic circuit which could be used in an identification system as shown in FIGS. 5 and 6.

FIG. 7 gives a part illustration of a key designed to work with the system illustrated in FIG. 6. First of all we find, at the bottom of FIG. 7, the succession of flip-flops 92 combined with the NAND gates 95 and 96 the operation of which has already been explained with reference to FIG. 4. All these flip-flops form, as has already been seen, a parallel-to-serial shift register with the direction of shift being shown by the arrow 146. The switches 10 shown in FIG. 4 are here replaced by the various fusible links 102.

Rupture of the fusible links is commanded by means of a second serial/parallel shift register 147 formed by a multiplicity of flip-flops 148 the Q output of which is connected to one input of an AND gate 149 receiving on its other input, via connection 150, the fusible link rupture signal appearing on terminal F. The output of each of the AND gates 149 is connected to one of the terminals of a fusible link 102 the other terminal of which is connected to earth by the T terminal.

The direction of shift of the second register 147 shown by arrow 151 is opposite to the direction of shift of the register formed by flip-flops 92. In these conditions the R and S inputs of the first flip-flop 148 p located on the right in FIG. 7 receives, via the two inverters 152, 153, connected in cascade, the write signal appearing on the E terminal and coming from shift register 104 which can be seen in FIG. 6. After the various flip-flops 148 of register 147 have been placed in the state corresponding to the signal coming from shift register 104 in FIG. 6, the fusible link rupture signal appears on terminal F which leads to the fusing of the fusible links 102 for which a signal appears on the Q output of the corresponding flip-flop 148 at the same time.

The various flip-flops 148 are reset by means of the flip-flop 92 loading signal via connection 154.

In the example in FIG. 7, sixteen fusible links 102 have been shown which form the changeable area of the key memory. For simplification only the right-hand and left-hand sections of the various elements have been shown in the figure. Nor does the figure show the fixed part of the memory data corresponding to the various switches 10, the structure of which is identical to that illustrated in FIG. 4.

One could obviously design a key containing only fusible links 102, i.e. an entirely modifiable memory area.

We claim:

1. A security system for enabling or preventing operation of an electrical, mechanical or other appliance, including in combination:

a portable key member comprising an energizable bus, normally de-energized, a parallel-to-serial shift register having a series of flip-flop means sequentially connected with each other, each said flip-flop means being either connected to or not connected to said bus according to a key code, so that, when said shift register is energized, the status of the series of connections and non-connections between said bus and said flip-flop means defines an identification code memorized within said portable key member, but, until such energization, said status constitutes a preprogrammed passive-type memory, a fixed lock member secured to said appliance and controlling its operation, normally preventing such operation. While permitting it when unlocked, and comprising key-receiving means for coupling with said key member, electric power supply means for energizing said first shift register upon coupling with said key member, single pulse loading means powered by said electric power supply means for supplying a single pulse to said shift register upon coupling of said key member and said lock member to cause thereby each of said flip-flop means to take a status depending upon the status of its said corresponding individual connection or non-connection to said bus and to load said identification code into said shift register, electronic means for serially receiving the contents of said shift register after actuation thereof by said loading means, and comparison means for comparing said identification with a code memorized into said lock, and for unlocking said lock member if they coincide.

2. A security system for enabling or preventing operation of an electrical, mechanical or other appliance, including in combination:

a portable key member comprising a series of concealed switches, each either in an ON position or an OFF position, so as to provide a key code and a parallel-to-serial shift register having a series of flip-flop means to sequentially connected with each other, each said flip-flop means being connected to one said switch, some said switches being in open position and some being in closed position, so that, when said shift register is energized the status of the series of switches acts on said flip-flop means to define an identification code memorized within said portable key member, but, until such energization, said status constitutes a preprogrammed passive-type memory, a fixed lock member secured to said appliance and controlling its operation, normally preventing such operation, while permitting it when unlocked, and comprising key-receiving means for coupling with said key member, electric power supply means for energizing said first shift register upon coupling with said key member, single-pulse loading means powered by said electric power supply means for supplying a single pulse to said shift register upon coupling of said key member and said lock member to cause thereby each of said flip-flop means to take a status depending upon the status of the switch to which it is connected and to load said identification code into said shift register, electronic means for serially receiving the contents of said first shift register after actuation thereof by said loading means, and comparison means for comparing said identification with a code memorized into said lock and for unlocking said lock member if they coincide.

3. A security system for enabling or preventing operation of an electrical, mechanical or other appliance, including in combination:

a portable key member comprising an energizable but normally non-energized bus, a parallel-to-serial shift register having a series of flip-flop means sequentially connected with each other and forming two groups of said flip-flop means, each said flip-flop means of the first group being either connected or not connected to said bus, according to a key code, so that, when said shift register is energized the status of the series of the first group of to said flip-flop means as to its connection or non-connection to said bus defines an identification code memorized within said portable key member, but, until such energization, said status constitutes a preprogrammed passive-type memory, each flip-flop means of said second group being connected to said bus through an individual connection, each of which may be destroyed by application of a destruction current pulse to said bus, the status of the plurality of the individual connections and non-connections defining a second identification code memorized within said key member, a fixed lock member secured to said appliance and controlling its operation, normally preventing such operation, while permitting it when unlocked, and comprising key-receiving means for coupling with said key member, electric power supply means for energizing said first shift register upon coupling with said key member, single-pulse loading means powered by said electric power supply means for supplying a single pulse to said shift register and said bus upon coupling of said key member and said lock member to cause thereby each of said flip-flop means to take a status depending upon the status of its said corresponding individual connection to said bus and to load said identification code into said shift register, electronic means for serially receiving the contents of said first shift register after actuation thereof by said loading means, comparison means for comparing said identification with a code memorized into said lock, used to unlock said lock member if they coincide, and writing means operable after serial reception of said identification code by said electronic means for applying a destruction current pulse to a predetermined member of individual connections of said second group to modify automatically the second identification code.

4. The identification system according to claim 2 or 3 wherein each switch is connected to its flip-flop means via two NAND gates, each receiving on one of their inputs the loading pulse, with the first of the said gates being connected by its other input to the switch and with the other gate receiving the output of the first gate on its other input.

5. The identification system according to claims 1, 2 or 3 wherein said loading means comprises a loading circuit provided with a master-slave type double flip-flop combined with a NAND gate and a clock circuit sending pulses to the slave flip-flop and to said NAND gate, said electronic means for serially receiving the contents of said shift register comprises a reading circuit provided with master-slave type double flip-flop combined with a NAND gate, and a clock circuit sending pulses to said reading circuit slave flip-flop and said reading circuit NAND gate and connected to the output of said loading means so as to supply successive pulses for serial reading of the data contained in the said shift register, wherein said loading means, said electronic means, and said comparison means all include flip-flop means and first time delay means connected to a monostable controlling the resetting of all of the system's such flip-flop means after said key member has been coupled with said lock member and before said loading pulse has been transmitted.

6. The identification system according to claim 5 having second time delay means connected to an additional set of monostables for controlling the resetting means and for cutting off said power supply means after said key member has been uncoupled from said lock member.

7. The identification system according to claim 5 wherein said electronic means also comprise a read stop circuit provided with at least one pulse counter and one monostable connected to the output of said reading means, comprising means for delivering a red stop pulse when the contents of said shift register have been read once.

8. The identification system according to claim 5 having a successive tests enabling circuit means containing a succession flip-flops the zero resetting of which depends on the positive result of the comparison carried out by said comparison means for setting off an alarm after a predetermined number of unsuccessful tests equal to the number of flip-flops in the said succession of flip-flops.

9. The identification system according to claim 1, 2 or 3 wherein said loading means comprises a loading circuit provided with a master-slave type double flip-flop combined with a NAND gate and a clock, circuit sending pulses to the slave flip-flop and to said NAND gate.

10. The identification system according to claims 1, 2 or 3, wherein said electronic, means for serially receiving the contents of said shift register comprises a reading circuit provided with a master-slave type double flip-flop combined with a NAND gate, and a clock circuit sending pulses to said reading circuit slave flip-flop and said reading circuit NAND gate and connected to the output of said loading means so as to supply successive pulses for serial reading of the data contained in the said shift register.

11. The identification system according to claim 10 wherein said electronic means also comprise a read stop circuit provided with at least one pulse counter and one monostable connected to the output of said reading means circuit, comprising means for delivering a read stop pulse when the contents of said shift register have been read once.

12. The identification system according to claim 2 wherein each connection to a flip-flop means, when present, is made via two NAND gates, each receiving on one of their inputs the loading pulse, with the first of the said gates being connected by its other input to the switch bus and with the other gate receiving the output of the first gate on its other input.

13. The identification system according to claim 1, 2 or 3 having a successive tests enabling circuit means containing a succession of flip-flops the zero resetting of which depends on the positive result of the comparison carried out by said comparison means for setting off an alarm after a predetermined number of unsuccessful tests equal to the number of flip-flops in the said succession of flip-flops.

14. The identification system according to claim 1, 2, or 3 wherein said loading means, said electronic means, and said comparison means all include flip-flop means and first time delay means connected to a monostable controlling the resetting of all of the system's such flip-flop means after said key member has been coupled with said lock member and before said loading pulse has been transmitted.

15. The identification system according to claim 14 having second time delay means connected to an additional set of monostable for controlling the resetting all the system's flip-flop means and for cutting off said power supply means after said key member has been uncoupled from said lock member.

16. The identification system according to claim 3 wherein the writing means comprises a parallel-to-serial shift register receiving drive pulses synchronized with the key member's shift register read pulses.

17. The identification system according to claim 3 having independent write stay means wherein the writing means parallel-to-serial shift register receives drive pulses the number of which is determined by said independent write stop means.

18. The identification system according to any of claims 3, 16, or 17 wherein the connections of said second group comprise a multiplicity of fusible links.

19. The identification system according to claim 16 wherein the key member also comprises a second flip-flop containing, serial-to-parallel shift register with an opposite direction of shift receiving the serial signal coming from the parallel/serial shift register of the writing means.

20. The identification system according to claim 19, wherein the connections of said second serial to parallel shift register comprise a multiplicity of fusible leaks and each flip-flop of the second serial-to-parallel shift register is connected to one input of an AND gate which receives on its other input a fusible link rupture signal and has its output connected to one of the terminals of a said fusible link.

21. The identification system according to claim 17 wherein the connections of said second group comprise a multiplicity of fusible links and said lock member also comprises means for supplying a signal commanding rupture of the fusible links after write stop.

22. The identification system according to claim 17, wherein the writing means are combined with a loading circuit provided with a master-slave double flip-flop supplying a pulse for loading data into said parallel-to-serial shift register of the writing means and a reading circuit provided with a master-slave double flip-flop supplying a succession of drive pulses to said parallel-to-serial shift register width said write stop circuit being provided with at least one counter working with a monostable.

23. The identification system according to claim 3 wherein said lock member comprises microprocessor means for supplying write order commands in order to change the said second group key member memory area according to a preset periodicity or criterion.

* * * * *